A. B. WILSON.
Sewing Machine.
No. 914. Reissued Feb. 28, 1860.
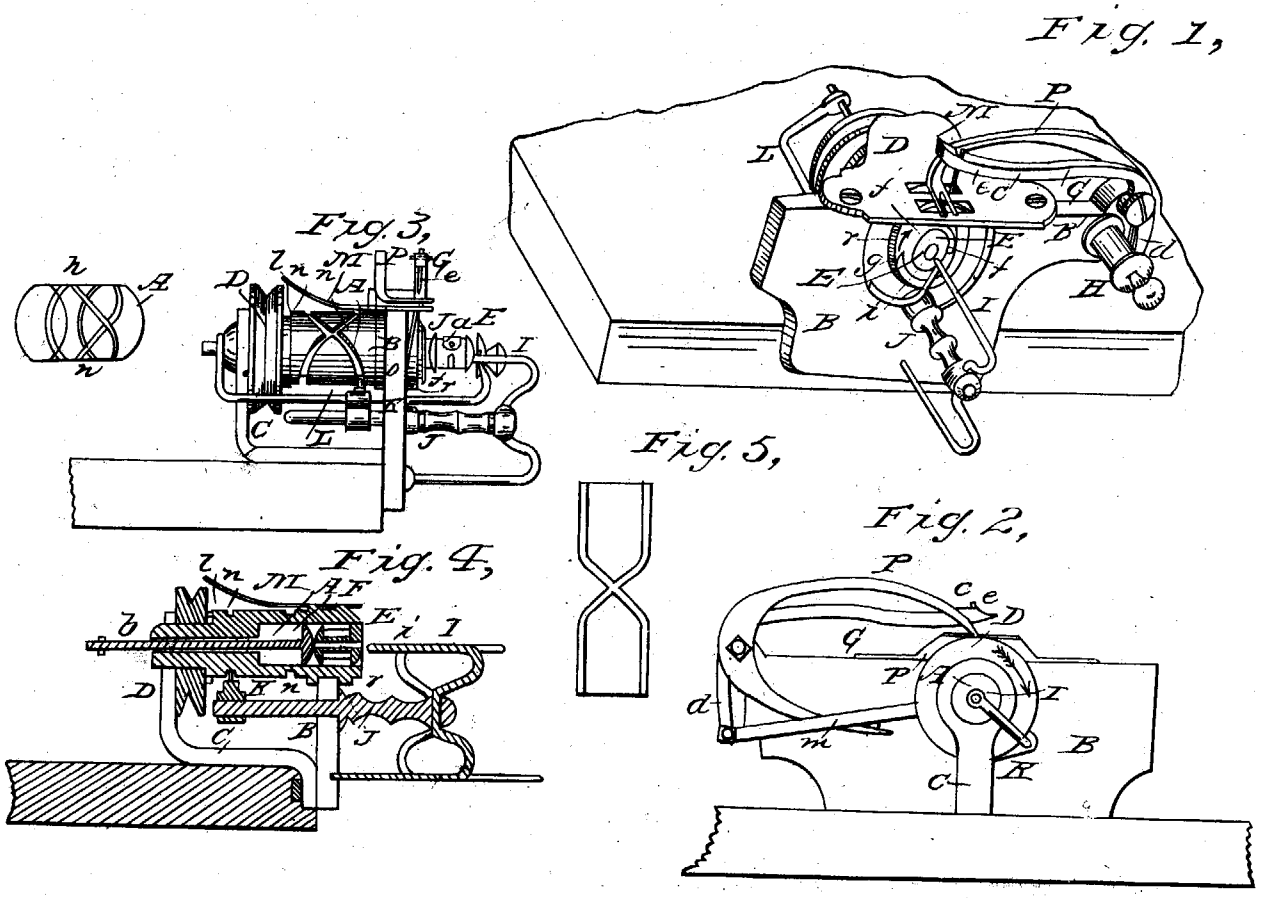
N. PETERS, Photo-Lithographer, Washington, D. C.

UNITED STATES PATENT OFFICE.

ALLEN B. WILSON, OF WATERBURY, CONN., ASSIGNOR, BY MESNE ASSIGNMENTS, TO THE WHEELER & WILSON MANUFACTURING COMPANY.

IMPROVEMENT IN THE PROCESS OF FORMING STITCHES BY MACHINERY.

Specification forming part of Letters Patent No. 8,296, dated August 12, 1851; Reissue No. 914, dated February 28, 1860.

DIVISION B.

*To all whom it may concern:*

Be it known that I, ALLEN B. WILSON, formerly of Watertown, Litchfield county, Connecticut, at present a resident of Waterbury, in the State of Connecticut, have invented a new and useful method or process of forming by means of machinery an interlocking stitch of two threads; and I do hereby declare that following specification, taken in connection with the drawings, is a full, clear, and exact description thereof, distinguishing my invention from another mode or process of forming the same stitch which has heretofore been essayed.

In speaking of methods of sewing and sewing-machines in this specification, I shall consider the cloth as lying horizontally, the needle as entering from the upper side, and the other machinery acting to form a stitch as lying below the cloth, in order to save words in description, but wish it understood that in my process, as in others, the cloth may lie in any plane, and the needle may enter it from either side.

The shuttle sewing-machine invented by Elias Howe, Jr., formed an interlocking stitch by means of two threads under a mode of operation as follows, viz: An eye-pointed needle pierced the cloth, carrying with it a bight of needle-thread, and when it had partially retracted, the points of a shuttle entered between the thread and the eye of the needle and passed through the loop of needle-thread, which latter was then pulled up, so as to draw the thread of the shuttle, which was left in the loop, into the cloth, the loop of needle-thread being pulled up tight by the motion of the needle away from the cloth, and the interlocking of two threads in the body of the cloth being completed before the needle again entered the cloth to make a new perforation for another stitch. In this mode of sewing by machinery, the eye-pointed needle, after entering the cloth and during its descent, carries down a quantity of its own thread whose length is just double the distance between the eye of the needle and the cloth at the time when the needle has entered to its greatest extent, (this thread then lying on each side of the needle.) As the needle begins to back out of the cloth the shuttle enters the loop of thread, and in its passage it surrounds itself with this loop, which is left under the cloth on the rise of the needle until the shuttle has passed through, and the needle, as before stated, pulls this loop up in its backing-out motion until its bight or angle is drawn into the cloth, carrying with it a bight of the shuttle-thread. In order to sew well under this mode of operation, the needle must enter the cloth far enough to furnish a loop of sufficient size for the passage of the shuttle, and with its needle-bar must recede far enough from the cloth to pull up the stitch, jamming the bights of both threads into the body of the cloth. This mode of making this stitch appears to me objectionable, for the reason that it necessitates a comparatively long range of motion of the needle, and also certain pauses in its motion, as is well known to builders of sewing-machines, both of which diminish the capacity of the machine for rapid sewing. Now, I have invented a method or process of forming the same stitch by machinery, in which it is not necessary for the needle to enter the cloth so far as to draw beneath it thread enough to encompass a bobbin, and which does not require that the needle-bar and needle should recede or be carried back far enough from the cloth to pull up the stitch by hauling the bight of needle-thread into the cloth. On the contrary, by my method the needle needs to enter the cloth only so far as to carry thread enough to admit of the entrance of a small point, and need only rise or back out of the cloth far enough to admit of the latter being moved along without touching the point of the needle.

My invention consists in a method or process of forming a double-thread stitch by means of proper machinery, in which process a loop of needle-thread of sufficient size is extended below. The cloth encompasses a bobbin-thread, or has a bobbin-thread passed through it, and remains below the cloth until the needle has entered it again, when the loop is pulled up tight through the cloth by the extension of the next succeeding loop of needle-thread, there being, during a part of the process, two loops of needle-thread below the cloth at the same time, and the new loop in each case being extended out of the thread constituting the preceding loop.

My invention will be most clearly understood by describing the machinery that I have contrived for reducing it to practice, and its operation.

In the drawings, Figure 1 is a view in perspective of the whole machine. Fig. 2 is an end view or elevation thereof. Fig. 3 is a side elevation of the same. Fig. 4 is a longitudinal vertical section through the center of the revolving mandrel. Fig. 5 is a view of the groove in the mandrel, supposing the latter to be transparent, and a development of that groove on a plane surface. Fig. 6 is a perspective view, on a large scale, of the hook, mandrel, and feeding-screw, showing the groove in the mandrel; and Fig. 7, a side elevation thereof detached from the other parts of the machine.

This machine is of small size and intended to be secured to a table, and is to be put in motion by means of an endless band or belt moved in some convenient manner, and applied to a whirl or pulley, D, secured to the revolving mandrel. The frame of the machine consists of a face-plate, B, and an arm or bracket, C, in which, in suitable journals, is free to revolve a hollow mandrel, A, which by its revolution gives their proper motions to all parts of the machine. Near the pulley the mandrel is turned off eccentrically, and surrounding this eccentric is an eccentric ring, *l*, secured to a rod, *m*, the end of which is attached by a pivot to the tail *d* of a bent lever pivoted to some stationary part of the machine, and prolonged, as at G, until it reaches nearly over the point where the stitching is to be done. In the end of this prolongation is secured an eye-pointed needle—such as *e*—and the operation of the parts is such that the revolution of the mandrel causes the needle to pierce the cloth, pass its point below it, and then rise above the cloth again, there being no sudden pauses or stops in its motion, and only a gradual coming to rest as the eccentric passes centers, in the same way as is produced by an ordinary crank motion.

The table or platform of the machine is exhibited at M as held in position by an attachment to the face-plate. It lies above the mandrel, and has in it a slot through which the feeding-screw can rise to act upon the cloth. Upon this platform the cloth is to be laid, and the cloth is to be held down upon it by a spring-guard or presser-foot, P, slotted so as to admit of the passage of the needle, and, for the sake of convenience, formed as a bent lever pivoted in line with the axis of the needle-lever, and having a spring-tail which abuts against a pin, *x*.

Upon the revolving mandrel, just under the slot and the spring-clamping surface or presser-foot P, is a portion of a single turn of a screw-thread, *j*, formed upon a collar, *r*. This screw-thread in its revolution projects through the slot, thus pinching the cloth between itself and the presser-foot, and as the latter has a smooth surface the rotation of the screw carries the cloth along, while grasped between the screw-thread and the foot, to a distance depending upon the pitch of the screw and the portion of the whole circumference of the mandrel over which it extends. Upon the revolving mandrel is formed another screw-thread, as at *f*, projecting at one end entirely beyond the mandrel and forming a hook, such as *g*. This screw-thread vanishes against the end or flat surface of the mandrel before it has passed entirely around or made one complete convolution, and as the mandrel revolves, the hook is so located that it will pass the needle in close proximity thereto, and on the side thereof farthest from the eccentric.

The mandrel is hollow, and in front of it, in line with its axis, is supported a rod, I, with one end, *i*, near the end of the mandrel. This rod is bent, as clearly shown in Fig. 4, and supported near its center in an arm, J, screwed into the face-plate and projecting inward so as to form a support and guide for a traverse-block, K, which slides upon it. The rod I may be turned at will into the position shown by faint lines in Fig. 4, and when in position as shown in Fig. 3 is held there by the lower end engaging in a shallow socket in the face-plate.

In the hollow of the mandrel rests a bobbin, E, having an axial aperture through it, and this bobbin can slide either in the hollow of the mandrel or on the rod, and its office is to hold the lower thread and carry it through loops of upper thread at proper intervals of time. In order that it may move as required for this latter duty, a piston, F, is located in the hollow of the mandrel and secured to a rod, *b*, which is attached to a wire, L, which is bent downward, thence extends horizontally through the traverse-block to which it is secured, and is further prolonged and bent upward till its end lies alongside of the rod I and in front of the bobbin, the shape being substantially such as is clearly shown in Fig. 3. The distance between the piston and the uppermost end of the wire is a little greater than the length of the spool, and as the piston and wire are in fact one piece, being joined together, they must, if reciprocated, push the bobbin off the rod into the hollow of the mandrel and out of that hollow onto the rod again. To secure such a reciprocation a groove shaped substantially as shown in Fig. 5 is formed in the surface of the mandrel, and into the groove projects a swinging traveler, *o*, fastened to the traverse-block. As the mandrel revolves, this groove, through the agency of the piston and wire, will, in a manner well known to mechanics, cause the bobbin to move to and fro rapidly, pausing for a considerable period at each end of its path, the groove being so shaped and located as to move the bobbin through a space a little greater than twice its own length, and to pass it alternately from opposite sides at proper times through loops of thread extended by the hook. This bobbin is to be supplied with thread, and has embracing it a spring friction-shield, *a*, with an eye in it, through which the thread passes to prevent it leaving the bobbin too freely. When the thread is used up, the bobbin may be removed by turning the rod I to the position shown by faint lines in Fig. 4, and moving the mandrel so that the piston will shove the bobbin out of the hollow. New thread can then be wound on it, the bobbin can be replaced when the piston is at the bottom of the hollow, and when the rod is turned back again and secured this part of the machine will again be ready for action.

The thread for the eye-pointed needle is to be wound upon a bobbin, H, attached in any suitable manner to any convenient part of the machine, and thence passed through an eye. *c*, in the needle-arm G, and finally through the eye of the eye-pointed needle. This bobbin is prevented from turning too freely by screwing it up against a leather washer.

Now, the operation of this machine is as follows: The presser-foot is to be raised and the material introduced between it and the table, the bobbins are to be supplied with thread, with the ends thereof passed as described, and motion is to be communicated to the mandrel in such direction as to cause the point of the hook, when above the axis of the mandrel, to advance toward the needle. The cloth will now be compressed firmly by the presser-foot onto the table. The needle, descending, will pierce it, carrying a bight of thread through the cloth, and when the needle has reached its lowest position the point of the hook passes between the needle and its thread, and by its motion draws out a loop of needle-thread as the needle rises. The outer part of this loop, as the hook revolves, lies in a straight line from the notch in the hook to the cloth, and the other part lies behind the screw-thread. As the hook revolves, this loop is extended, and when the hook has made about five-eighths of a revolution the loop is enlarged sufficiently to surround or encompass the bobbin, which then passes through the loop, thus interlocking its own thread in the loop of upper needle-thread. As the hook continues to revolve, part of the loop is thrown off by the vanishing of the screw-head against the flat end of the mandrel, and the bight of it is released by the change of direction of the motion of the hook, and the needle has again entered the cloth and got to its lowest position. The hook then seizes another loop of needle-thread and extends it; but it extends that loop by drawing up the loop that the hook had just cast off and left slack below the cloth, so that the cast-off loop furnishes nearly all the thread for the new loop, and so that the cast-off loop is drawn through the cloth to form the new loop, conveying the lower thread into the cloth and tightening the stitch last made. This machine, therefore, in its operation forms the stitches according to my new method or process, and has at certain periods two loops of the needle-thread below the cloth at the same time—one in the act of being drawn up to jam a bight of bobbin-thread into the cloth, and thus pull up a stitch, and while being drawn up furnishing thread for another loop, the other being in the act of extension, or being extended out of the material of the preceding loop, and to such size as may be necessary to encompass a bobbin. The thread of this latter loop is therefore not conveyed below the cloth by the motion of the needle after it has pierced the cloth, and the needle does not, in its receding motion, pull up the stitch; but both the extension of the loop and the pulling up of the stitch are dependent upon the motions of the hook; and in consequence of this new method of forming stitches by machinery I can build machines with a short stroke of needle, with a needle moved by an eccentric or crank motion, and without any machinery or contrivances on the upper side of the cloth to control the slack of needle-thread; and the result is that the machine can be built cheaper, will run faster and with less friction, and will wear longer than machines constructed to make stitches or seams under the mode of operation exemplified by the machine of Elias Howe, Jr., which may be taken as a type of machines heretofore made which sew by interlocking the bights of two threads.

I claim as of my own invention—

The mode or process, substantially as hereinbefore specified, of making a double-thread stitch by means of machinery, its characteristics being as follows: First, that there are at certain periods in the formation of the seam two loops of needle-thread below the cloth at the same time, one being extended and the other being drawn up, substantially in the manner and for the purpose specified; and, second, that the stitch is tightened or drawn up by the extension of the next succeeding loop, as distinguished from a drawing up of the stitch by the motion of the needle or needle-bar.

In testimony whereof I have hereunto subscribed my name, in the city of Waterbury, on this 10th day of May, A. D. 1859.

ALLEN B. WILSON.

In presence of—
NORTON J. BUEL,
EDWARD B. COOKE.